United States Patent [19]

Rinaldo

[11] 3,724,303

[45] Apr. 3, 1973

[54] CHAMFERING APPARATUS FOR TUBULAR ARTICLES

[75] Inventor: Michael S. Rinaldo, Youngstown, Ohio

[73] Assignee: Wm. K. Stamets Company, Columbiana, Ohio

[22] Filed: Apr. 16, 1971

[21] Appl. No.: 134,608

[52] U.S. Cl. ............................ 82/59 R, 82/60, 82/65, 82/70.2, 82/4 C
[51] Int. Cl. ............................ B23b 3/04, B23b 5/14
[58] Field of Search ............ 82/59, 60, 61, 62, 63, 64, 82/65, 66, 67, 68, 69, 70, 70.2, 71, 72, 73, 74, 75, 76, 77, 4.3

[56] References Cited

UNITED STATES PATENTS

| 1,782,692 | 11/1930 | Lawson | 82/59 X |
| 1,635,807 | 7/1927 | Amberg | 82/59 X |
| 2,905,243 | 9/1959 | Rodder | 82/61 |
| 2,619,174 | 11/1952 | Neale | 82/63 X |
| 3,630,109 | 12/1971 | MacMichart et al. | 82/4 C |
| 3,641,851 | 2/1972 | Gibbs et al. | 82/4 C |
| 3,608,406 | 9/1971 | Paysinger et al. | 82/4 C |

*Primary Examiner*—Harrison L. Hinson
*Attorney*—Oberlin, Maky, Donnelly & Renner

[57] ABSTRACT

A rotatable tool head having a radially movable tool holder connected to a guide member radially movable into engagement with the cylindrical wall of the work. The guide member has a cam slot for a roller carried by the tool holder which is radially movable at a different speed than the guide member whereby the roller moves in the slot to direct a chamfering tool into cutting engagement with the work piece while the guide member is held in sliding engagement with the cylindrical wall of the work piece by a spring biasing the guide member towards the cylindrical wall. The tool head also carries radially movable tool holders for cutting through the wall of the work piece.

18 Claims, 7 Drawing Figures

PATENTED APR 3 1973 3,724,303

INVENTOR.
MICHAEL S. RINALDO
BY
Oberlin, Maky, Donnelly & Renner
ATTORNEYS

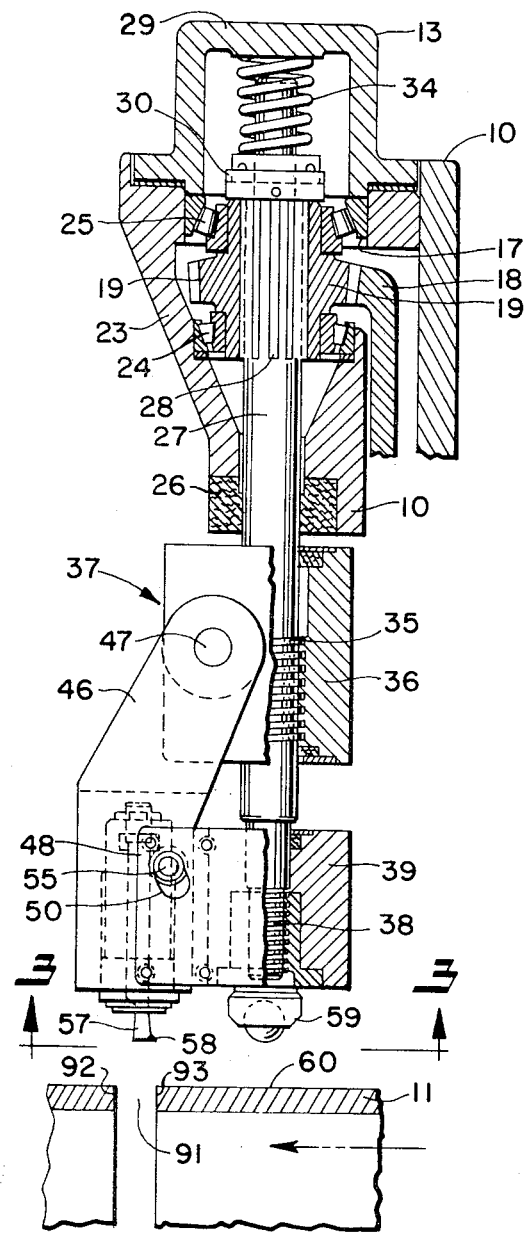
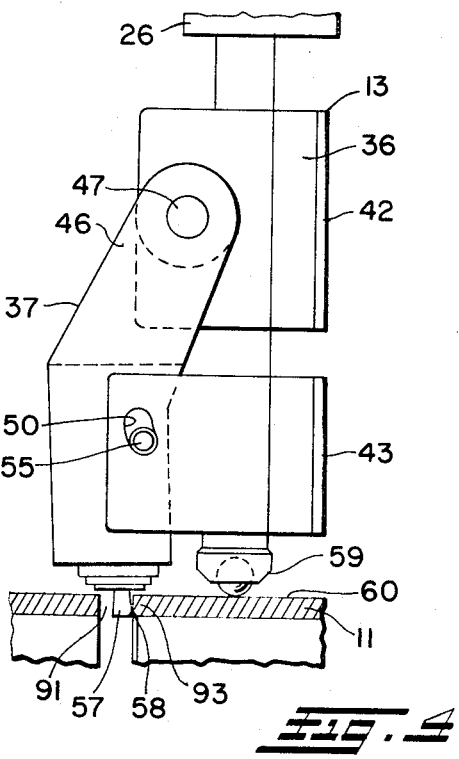
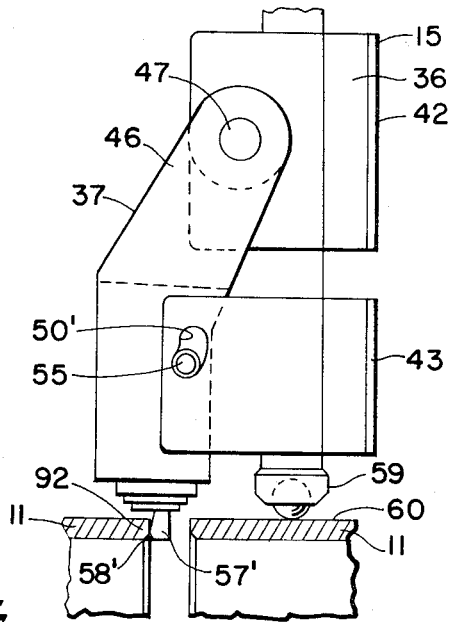

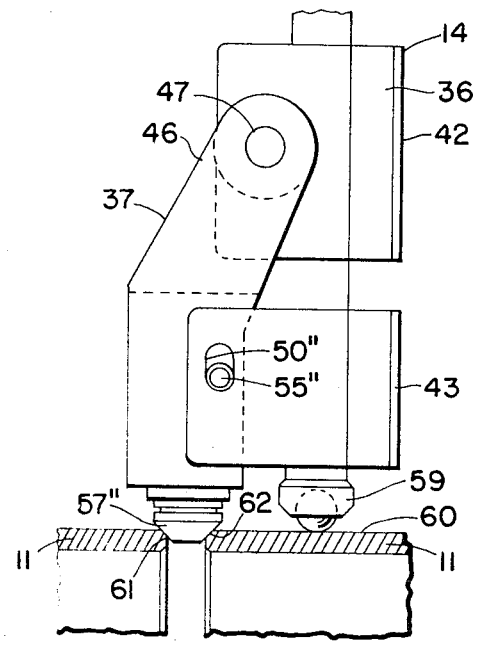
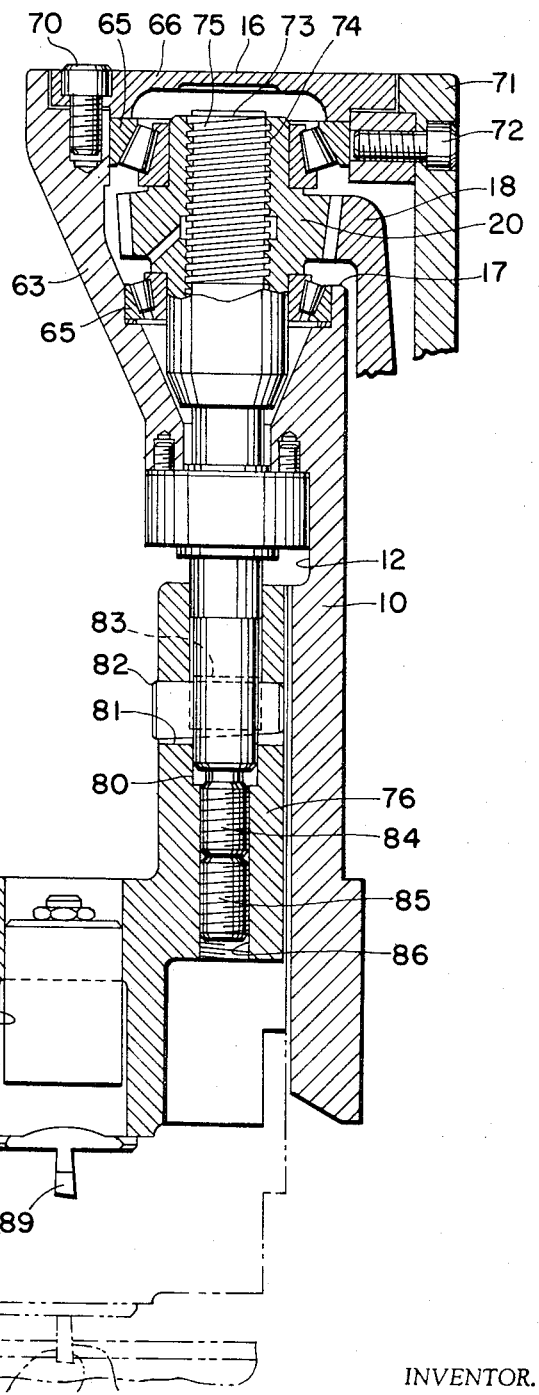

CHAMFERING APPARATUS FOR TUBULAR ARTICLES

Pipe and other tubular articles have been machined and cut off by rotating cutter heads which carry tool holders around the article and feed the cutting tools radially inward through the walls of the pipe or tubing. These machines have been developed to a point where the cutoff operation is performed at a very high speed and substantial lengths of pipe or tubing can be cut in a very short time. The cut pipe or tubing can be used for some purposes without further machining; however, in many applications, the edges must be chamfered at the inner diameter and outer diameter. This requires another operation which doubles the handling and time required to cut off and finish the edges. Additional machinery is also required which adds to the cost of this operation.

Chamfering of the inner diameter and outer diameter edges at the same time that the cutoff operation is performed is difficult because the pipe or tubing may be out-of-round and a chamfering cutting tool mounted on a tool holder for a cutoff tool would produce a chamfer having an uneven depth around the pipe. Difficulties would also be had in feeding the chamfering cutter under the edges of the pipe or tubing to obtain the inner diameter chamfers at the leading and trailing edges of the pipe. This is not readily done because with the tool holders used for the cutoff cutters the feed is only in the radial direction and there is no provision for axial feed of the cutters which is necessary for the chamfering at the inner diameter.

Although it has not been possible to adapt the tools for cutting off the pipe to do the chamfering, it would be undesirable to add separate feeding and driving mechanism for the chamfering tools because of the space limitations and the increase in cost which would result.

In the present invention, the chamfering tools may be driven by the same ring gear which drives the cut-off tools and the tool holders or the chamfering tools are located in spaces available between the cutoff tools so that no additional space requirements are added. The chamfering is performed immediately following the cutting operation and a guide member which rides on the surface of the work piece and is held there by a spring controls the depth of the chamfering cut so that it will be the same regardless of the out-of-round condition of the work piece. This is true for the outer diameter chamfer and the leading edge inner diameter chamfer and trailing edge inner diameter chamfer.

The feeding of the chamfer cutting tools is coordinated with the feeding of the cutoff tools so that the inner diameter leading edge and trailing edge chamfer tools enter the slot cut by the cutoff tools following the cutting operation and perform the chamfering operation almost as though it were a continuation of the cutting operation. Immediately after the chamfering all of the tools including the chamfering tools and cutoff tools are removed as is the guide member in a radially outward direction to clear the space around the tubing or pipe so that it can be released from the clamping mechanism and moved to the next position for cutting or removal to stacking location.

A guide member is provided for the chamfering tools which moves at a different radial speed than the tool holder and is connected to an axially moving member of the tool holder to impart axial movement to the chamfers for the trailing edge and leading inner diameter chamfering tools while at the same time controlling the depth of the chamfer so that it is even all the way around the edges.

The accompanying drawings show a preferred form made in accordance with and embodying this invention and which is representative of how this invention may be practiced.

In the drawings:

FIG. 2 is an enlarged sectional view taken along the plane of line 2—2 of FIG. 1 with some of the parts being broken away, showing the chamfer tools for the inner diameter leading edge in the retracted position.

FIG. 4 is a schematic view like FIG. 2 showing the inner diameter leading edge chamfering tool in the cutting position.

FIG. 5 is a view like FIG. 4 showing the inner diameter trailing edge chamfering tool in the cutting position.

FIG. 6 is a view like FIG. 4 showing the outer diameter chamfering tool in the cutting position.

FIG. 7 is a cross sectional view of the cutoff tool taken along the plane of line 7—7 of FIG. 1, parts being broken away and showing the cutoff tool in the retracted condition in full lines and in the cutting position in chain-dotted lines with the work piece also being shown in chain-dotted lines.

Figure 1:
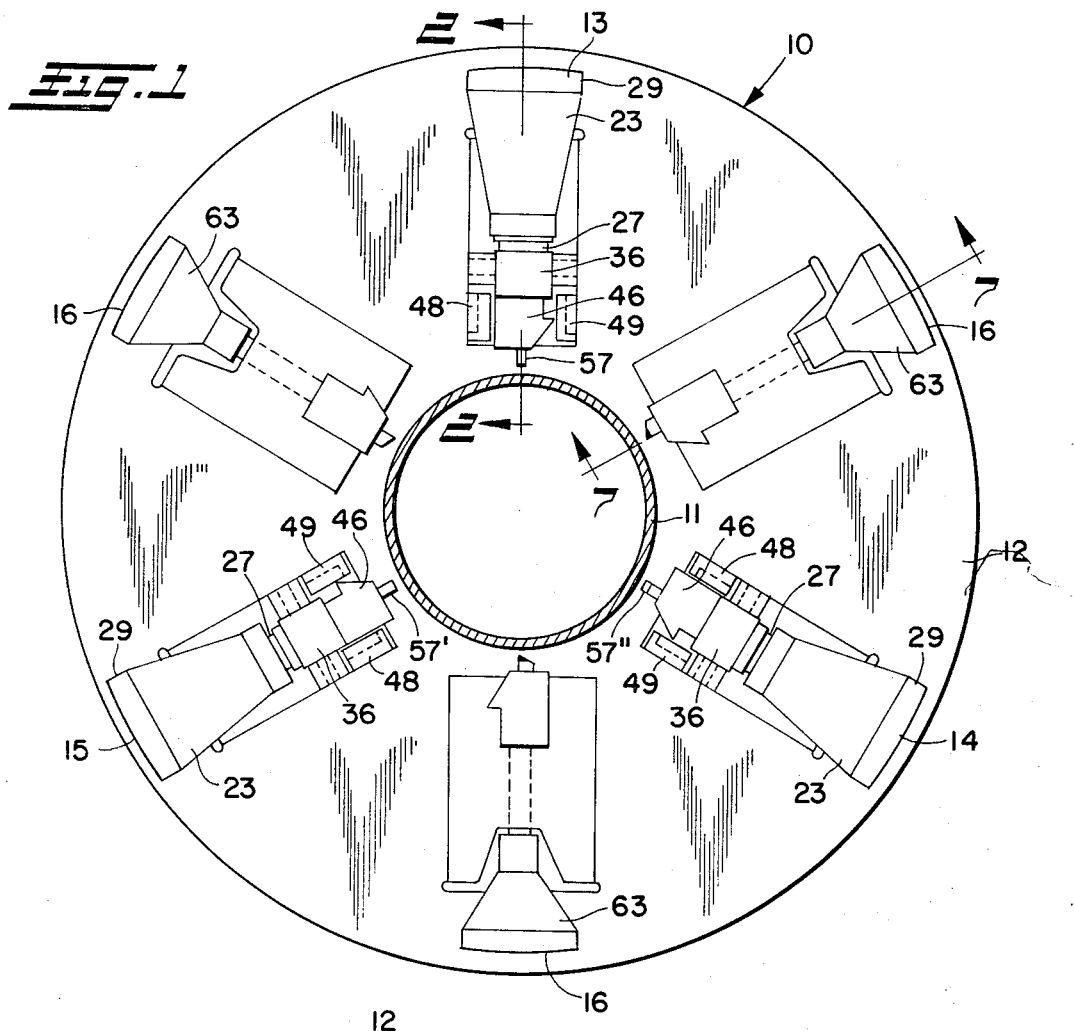
FIG. 1 is an axial elevation of a rotatable tool head carrying chamfering tools as well as cutoff tools with the parts thereof being shown schematically.

A rotatable tool head 10 of the type adaptable for use in a pipe cutoff machine such as that shown and described in U.S. Pat. No. 2,459,075 of R. L. Hibbard is shown in FIG. 1. These cutoff machine tools have a stationary sleeve through which a piece such as a cylindrical tubing or pipe 11 may be fed and clamped in position for cutting or chamfering. A spindle is mounted concentrically around the stationary sleeve for rotation by gears connected to a drive shaft and drive motor. A tool head 10 is mounted on the spindle for rotation with the spindle.

A plurality of radially disposed tools are mounted at circumferentially spaced-apart positions on the outboard face 12 of the tool head 10. An inner diameter leading edge chamfer tool 13, an outer diameter chamfer tool 14 and an inner diameter trailing edge chamfer tool 15 are mounted in the spaces between three equally spaced cutting tools 16 on the outboard face 12 of the tool head 10. As shown more clearly in FIGS. 2 and 7, the outboard face 12 has a circumferentially extending slot 17 providing an opening through which a beveled ring gear 18 extends into engagement with beveled pinions 19 for driving the chamfer tools 13, 14 and 15 and beveled pinions 20 for driving the cutting tools 16. As shown and described in the Hibbard U.S. Pat. No. 2,459,075, the ring gear 18 may be driven at the same speed as the tool head 10 or at a slower or faster speed through the control mechanism described in detail in the patent. When the ring gear 18 is rotating at the same speed as the tool head 10, there will be no rotation of the beveled pinions 19 and 20 whereas when there is a differential in the speed of the tool head 10 and ring gear 18 the beveled pinions 19 and 20 will be rotated accordingly.

As shown more clearly in FIG. 2, the inner diameter leading edge chamfer tool 13 has a housing 23 which may be part of the tool head 10 for carrying thrust bearings 24 and 25 supporting the beveled pinion 19. The housing 23 may also have a sleeve bearing 26 for supporting a drive means such as a shaft 27 for rotation and axial movement in the radial direction of the tool head 10. The beveled pinion 19 of this chamfer tool 13 has longitudinal grooves for engagement with splines 28 on the shaft 27 providing for axial movement of the shaft relative to the pinion in a direction radially of the tool head 10. The shaft 27 extends radially outward from the beveled pinion 19 and is enclosed by cover member 29 fastened to the housing 23 by screws or other suitable fastening means. A collar 30 which may be a split ring is fastened to the shaft at a position spaced from the radially outer end and pressure means such as spring 34 is interposed between the face of the cover member 29 and the collar 30 so as to bias the shaft in a direction radially inward of the tool head 10.

Radially inward of the housing 23, the shaft has a threaded portion 35 in meshing engagement with the sliding nut member 36 of a tool holder 37. A second threaded portion 38 is provided at the radially innermost end of the shaft 27 for engagement with threads in a sliding guide member 39. Both the sliding nut members 36 and sliding guide member 39 have dovetail slides 42 and 43, respectfully, for engagement with adjustable ways 44 and 45 mounted on the outboard face 12 of the tool head 10 for movement in the direction radially of the tool head. The threads on the threaded portion 35 of the sliding nut member 36 have a pitch which is greater than the pitch of the threads of the second threaded portion 38 of the sliding guide member 39. Accordingly, when the shaft 27 is turned the sliding nut member 36 will move at a faster speed than the sliding guide member 39.

The tool holder 37 has an axially movable member such as arm 46 which is pivotally mounted on the sliding nut member 36 for swinging movement about pivot pin 47 extending in a direction transversely of the direction in which the pipe 11 moves, shown by the arrow in FIG. 2. The arm 46 extends radially inwardly of the tool head 10 between flanges 48 and 49 having cam slots 50 and 51 which receive cam rollers 55 and 56 extending outwardly in a transverse direction from the arm 46 into the cam slots. The cam slots 50 and 51 for the inner diameter leading edge chamfer tool extends radially in a direction parallel with the outboard face 12 of the tool head 10 to a radially inward position where they are curved toward the leading edge of the pipe 11.

A chamfering tool 57 is held in the tool holder arm 46 by conventional tool holding apparatus and has a projecting edge 58 extending towards the leading edge of the pipe 11.

A ball and socket member 59 is mounted on the radially inner face of the sliding guide member 39 for sliding engagement with a surface 60 of the pipe 11, as shown in FIG. 4.

The inside diameter trailing edge chamfer tool 15, shown in FIG. 5, is identical with the inside diameter leading edge chamfer tool shown in FIG. 4 except that the cam slots 50' and 51' have a radially inward portion which is curved toward the trailing edge of the pipe 11 and the chamfering tool 57' has a projecting cutting edge 58' extending in the direction of the trailing edge of the pipe 11.

The outside diameter chamfering tool 14 for the leading and trailing edges of the pipe 11, shown in FIG. 6, is also identical with the construction described for the inside diameter leading edge chamfer tool 13 with the exception that the cam slots 50'' and 51'' are straight and have no curved portion and the chamfering tool 57'' has double cutting edges 61 and 62 for cutting engagement with the leading edge and trailing edge of the pipe at the outside diameter.

Referring to FIG. 7, one of the cutting tools 16 is shown. A housing 63, which may be part of the tool head 10, supports thrust bearings 64 and 65 in which the pinion 20 is rotatably mounted. A cover 66 is fastened at the radially outer edges of the housing by screws 70. Other housing members such as cover 71 may also be fastened to the tool head 10 by screws 72.

A shaft 73 extends radially through the housing 63 and is in threaded engagement with inside threads 74 of the beveled pinion 20 which mesh with a threaded portion 75 of the shaft.

Figure 3:
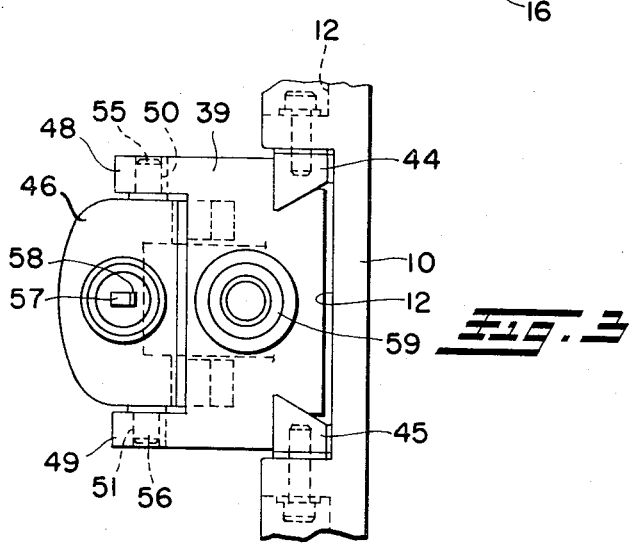
FIG. 3 is an end view taken along the plane of line 3—3 of FIG. 2, parts being broken away.

Radially inward of the housing 63, the shaft 73 is connected to a tool holder 76 which may have a dovetail slide in engagement with ways mounted on the tool head 10 similar to the construction shown in FIG. 3. The tool holder 76 has a radially extending hole 80 for receiving the end of the shaft 73. A slot 81 opening on the hole 80 is provided for a wedge member 82 which passes through a key opening 83 in the shaft 73. Screw members 84 and 85 are threaded in an extension of the hole 86 and may be used to lock the shaft 73 in the tool holder 76. A cutting tool 89 is mounted in a tool holding cavity 90 by conventional tool holding apparatus well known in the art.

In operation, the pipe 11 is inserted in the pipe cutting tool and through the tool head 10 where it is held in a centered cutting position by chucks or other clamping means. With this construction, pipes having a range of diameters may be cut and chamfered. The tool head 10 is then rotated with the chamfer tools 13, 14 and 15 and the cutting tools 16 in the retracted position as shown in FIG. 1. The beveled ring gear 18 is also rotated in the same direction as the tool head 10. As long as the beveled ring gear 18 rotates at the same speed as the tool head 10, there will be no feeding or retracting of the chamfering or cutting tools because the beveled pinions 19 for the chamfer tools and the beveled pinions 20 for the cutting tools will not be rotated.

As soon as the tool head 10 reaches a speed of rotation suitable for cutting, the speed controls for the ring gear 18 change the speed of the ring gear producing a differential in speed between the ring gear and tool head causing rotation of the beveled pinions 19 and 20.

Referring to FIG. 7, the rotation of the beveled pinion 20, of the cutting tool 16 turn the inside threads 74 of the pinion which are meshed with the threaded portion 75 of the shaft 73 and feeds the shaft in a radially inward direction of the tool head 10. This movement is transmitted through the shaft 73 to the tool holder 76 moving the tool holder and the cutting tool 89 from the position shown in the full lines radially inward to the position shown in the chain-dotted lines. The cutting tool 89 enters the wall of the pipe 11 forming a slot 91 with a trailing edge 92 at the left side of the slot, as seen in FIG. 7, and a leading edge 93 at the right side of the slot, as seen in FIG. 7.

During the time that the cutting tool 89 is forming the slot 91 in the pipe 11, the beveled pinion 19 of the chamfer tools 13, 14 and 15 are being rotated causing the shaft 27 to rotate and move the sliding nut member 36 and the sliding guide member 39 in a radially inward direction so that as soon as the slot 91 is cut the chamfering operation may proceed. As the beveled pinion 19 rotates, the shaft 27 is rotated through the splines 28 engaging the grooves of the pinion. The threaded portion 35 of the shaft engages the sliding nut member 36 and the rotation of the shaft feeds the sliding nut member radially inward carrying with it the tool holder 37 including the arm 46 and chamfering tool 57. At the same time, the second threaded portion 38 of the shaft 27 is rotated in threaded engagement with the sliding guide member 39 moving it in a radially inward direction and carrying the ball and socket member 59 into engagement with the surface 60 of pipe 11.

This chamfering operation is timed so that the chamfering tool 57 does not enter the slot 91 until after the tool 89 has completed the cut. At this point, however, the chamfering tool 58 enters the slot immediately and then because of the difference in pitch of the threaded portion 35 and second threaded portion 38, the cam rollers 55 and 56 move radially inward in the cam slots 50 and 51 causing the arm 46 to swing axially toward the leading edge 93 so that the chamfering tool 58 engages the inner diameter of the leading edge 93 with the projecting edge 58 of the chamfering tool beveling the edge at the inner diameter.

The ball and socket member 59 is maintained in slidable engagement with the surface 60 of the pipe 11 by the coil spring 34 which biases the shaft in a radially inward direction as the coil spring is compressed by turning of the second threaded portion 38 in the sliding guide member 39 which feeds the ball and socket member 59 into engagement with the surface 60 of the pipe and then on further turning action of the shaft 27 moves the shaft radially outward with the splines 28 sliding through the beveled pinion 19 and moving the collar 30 radially outward toward the face of the cover member 29. With this spring action pulling the ball and socket member 59 against the surface 60 of the pipe 11, it can be seen that if the pipe were out-of-round, the ball and socket member would ride along the surface 60 and move radially inward or radially outward to compensate for this change in dimension. As the ball and socket member moves radially inward or radially outward, the shaft 27 would also be moved radially inward and outward and carry the tool holder 37 as well as the chamfering tool 57 with the shaft. As a result, the chamfering cut will be maintained at the same depth throughout the circumference of the leading edge 93 and an even chamfer will result.

At the same time that the inside diameter leading edge chamfer tool 13 is in cutting operation as shown in FIG. 4, the inside diameter trailing edge chamfer tool 15 is also in cutting operation as shown in FIG. 5. The cam rollers 55 and 56 move downward in the cam slots 50' and 51' rotating the arm 46 about pivot pin 47 in a direction toward the trailing edge 92 with projecting edge 58' of the cutter 57' cutting a chamfer at the inside diameter of the trailing edge. The outside diameter chamfering tool 14 also is fed into cutting position simultaneously with the inside diameter chamfer tools 13 and 14; however, the chamfering tool 57'' is fed directly radially inward by the movement of the cam rollers 55 and 56 in a straight path in the cam slots 50'' and 51'' so that the cutting edges 61 and 62 will engage the outside diameter trailing edge 92 and leading edge 93.

After the chamfering operation has been completed, the machine tool controls are actuated to change the speed of the ring gear 18 so that the differential speed of rotation of the ring gear and the tool head 10 rotates the beveled pinions 19 and 20 in the opposite direction. In each of the cutting tools 16, rotation of the beveled pinions 20 feeds the shaft 73 radially outward of the tool head 10 and carries the tool holder 76 and cutting tool 89 away from the pipe 11. This same differential speed of rotation turns the beveled pinions 19 of the chamfer tools 13, 14 and 15 in the opposite directions and feeds the sliding nut member 36 and the sliding guide member 39 radially outward moving the tool holder 37 and the chamfering tool 57 as well as the ball and socket member 59 away from the pipe 11. This operation continues until the tools are in the position shown in FIG. 1 providing clearance for movement of the pipe out of the machine tool or to the next cutting position.

While certain representative embodiments and details have been shown for the purpose of illustrating the invention, it will be apparent to those skilled in the art that various changes and modifications may be made therein without departing from the spirit or scope of the invention.

I, therefore, particularly point out and distinctly claim as my invention:

1. A machine tool for cutting a cylindrical work piece held in a stationary position comprising a tool head rotatable about a work piece, a tool holder mounted on said tool head for radial movement toward and away from the work piece, a radially movable guide member mounted on said tool holder, movement controlling means between said guide member and said tool holder for directing the movement of a cutting tool held in said tool holder and drive means in engagement with said tool holder for moving said holder radially inward and outward for controlled cutting engagement and disengagement of said cutting tool with the work piece.

2. A machine tool according to claim 1 wherein said guide member is movable into sliding engagement with the surface of the work piece so as to regulate the depth of said cutting tool.

3. A machine tool according to claim 2 wherein said drive means is in engagement with said guide member for moving said guide member into sliding engagement with the surface of the work piece during the cutting operation and out of engagement after the cutting operation to permit movement of the work piece to a new position for the next cut.

4. A machine tool according to claim 2 wherein pressure means is disposed in operative engagement with said drive means for biasing said guide means radially inward against the surface of the work piece to accommodate variations in diameter of the work piece.

5. A machine tool according to claim 4 wherein said drive means comprises a rotatable shaft having threaded portions in threaded engagement with said tool holder and said guide member.

6. A machine tool according to claim 5 wherein said drive means further comprises gear means mounted on said shaft for engagement with a ring gear rotatable at the same speed as said tool head to stop radial movement of said tool holder and at a higher or lower speed than said tool head to rotate said shaft and move said tool holder radially.

7. A machine tool according to claim 6 wherein the connection between said gear means and said shaft is splined to permit radial movement of said shaft and said pressure means is a spring biasing said shaft radially inward and pressing said guide member against the surface of the work piece.

8. A machine tool according to claim 7 wherein the pitch of the threaded connection between said shaft and said guide member is less than the pitch of the threaded connection between said shaft and said tool holder whereby the movement of said tool holder will be faster than the movement of said guide member.

9. A machine tool according to claim 1 wherein said tool holder has a movable member holding said cutting tool for movement of said cutting tool axially into cutting relation with the work piece.

10. A machine tool according to claim 9 wherein said movable member is pivotally connected to said tool holder for movement of said cutting tool in an axial direction.

11. A machine tool according to claim 10 wherein said movement controlling means comprises a cam roller and a cam slot on said movable member and said guide member.

12. A machine tool according to claim 11 wherein said cam slot is straight with a curved end portion whereby said movable member carries said cutting tool axially into chamfering engagement with the inner edges of a wall of the cylindrical work piece after movement through a circumferential cut opening.

13. A machine tool for cutting a cylindrical work piece held in a stationary position comprising a tool head rotatable about the work piece, a plurality of radially movable tool holders mounted on said tool head at spaced-apart positions circumferentially of said tool head, each of said tool holders being in engagement with drive means for moving of a cutting tool held in said tool holder into cutting engagement with the work piece, at least one of said tool holders being connected to a guide member by a movement controlling means for directing the movement of said cutting tool into and out of engagement with the work piece and a ring gear in driving engagement with said drive means rotatable at the same speed as said tool head to stop radial movement of said tool holders and rotatable at a higher or lower speed to move said tool holders in the radial direction.

14. A machine tool according to claim 13 wherein said tool holder connected to said guide member has a chamfering cutting tool which is moved radially into engagement with the work piece after the cutting tools of other of said tools have cut a slot through the wall of the work piece.

15. A machine tool according to claim 14 wherein said chamfering cutting tool is moved through the slot in the wall of the work piece and then moved axially by said movement controlling means to chamfer the inner edge of the work piece.

16. A machine tool according to claim 15 wherein said guide member is slidably engageable with the surface of the work piece for controlling the depth of the chamfer cut where the work piece is off center.

17. A machine tool according to claim 16 wherein the drive means of said tool holder connected to said guide member further comprises a shaft, a gear in engagement with said ring gear and said gear being connected to said shaft at a splined portion to permit radial movement relative to said gear.

18. A machine tool according to claim 17 wherein spring means between said shaft and said tool head hold said guide member against the surface of the cylindrical work piece.

* * * * *